United States Patent Office 3,536,941
Patented Oct. 27, 1970

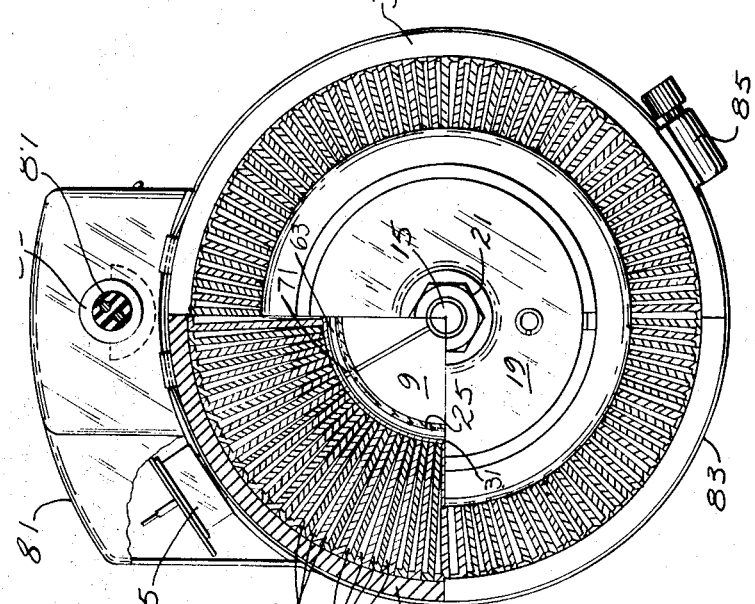

3,536,941
LINEAR SYNCHRONOUS ELECTRIC MOTOR WITH RECIPROCATING ARMATURE
Fredrick Tourtellotte, Royal Oak, Mich., assignor to Eaton Yale and Towne, Inc., Cleveland, Ohio, a corporation of Ohio
Filed Oct. 10, 1967, Ser. No. 674,175
Int. Cl. H02k 33/08
U.S. Cl. 310—27   6 Claims

ABSTRACT OF THE DISCLOSURE

A linear synchronous motor includes a generally cylindrical stator having a bore and a pole piece coaxially positioned in the bore of the stator with a lightweight armature having a pair of spaced magnetizable portions which are axially reciprocable in a gap formed between the stator and the pole piece. A steady polarizing field and a pair of radially pulsating electromagnetic fields of varying intensity are produced in a magnetic circuit including the stator and the pole assembly by a D.C. excited field coil and a pair of A.C. excited stator coils respectively, energization of which develops a force which acts upon the armature causing the armature to move to increase the permeance of the instantaneous magnetic flux circuit. As the polarity of the A.C. excited stator coils is reversed the force acting upon the armature reverses direction thereby reciprocating the armature synchronously without slip at the frequency of the A.C. input applied to the stator coils.

BACKGROUND OF THE INVENTION

This invention pertains to an electric motor, and more particularly to a linear synchronous motor for axially reciprocating an output member.

Heretofore, linear motors have been developed which utilize a stator and stator winding for producing an electromagnetic field for reciprocating an armature. Such motors employ relatively massive movable ferromagnetic armature structures for conducting the flux constituted by the armature and stator. As a result of the massive reciprocating structure, the stroking rate and hence usefulness of the linear motor has been quite limited. Although lightweight low-inertia moving-coil type linear motors have been utilized for some applications, these motors depend upon the force experienced by a current-carrying conductor, i.e., the conductor, in a magnetic field. Such motors require electrical connection with the moving coil and are hence inherently fragile and unreliable.

SUMMARY OF THE INVENTION

Among the several objects of the present invention may be noted the provision of a linear motor which reciprocates an output member synchronously under varying load conditions wherein synchronously as used herein is defined as movement of the armature without slip in phase with the A.C. input applied to the stator coils; the provision of such a motor which operates at line frequency and is capable of starting without slip from a dead stop under load and of supplying full-rated force in either direction at all intermediate stroking positions of the armature; the provision of such a motor which is extremely efficient in both electrical and mechanical operational characteristics; and the provision of a linear motor having cooling and/or rigidizing passageways in the stator assembly. In addition, the present invention is characterized by simplicity of construction and low cost. Other objects and features will be in part apparent and in part pointed out hereinafter.

Briefly, a linear motor of this invention includes a generally cylindrical stator structure having a pole piece positioned coaxially within the bore thereof. The pole piece has an outer dimension somewhat less than that of the bore of the stator to provide a tubular gap therebetween. A tubular armature having at least one magnetizable portion is axially movable in the tubular gap. The stator and pole piece comprise a magnetic circuit providing a flux path across the gap, and means are provided for producing a steady polarizing field and an A.C. excited field in the circuit and across the gap, said A.C. excited field varying or pulsating in intensity relative to the instantaneous magnitude of the applied A.C. waveform, whereby a force is developed which acts upon the armature causing the armature to move to increase the permeance of the instantaneous magnetic flux circuit and to effect linear movement of the armature. As the polarity of the A.C. excited coils alternates and is reversed, the force acting upon the armature reverses direction thereby reciprocating the armature synchronously at the frequency of the applied A.C. input.

BRIEF DESCRIPTION OF THE DRAWING

FIG. 1 is a longitudinal section of a linear synchronous motor of the present invention;

FIG. 2 is a vertical section taken on line 2—2 of FIG. 1;

FIG. 3 is an elevation of one of the stator laminations;

Corresponding reference characters indicate corresponding parts throughout the several views of the drawings.

DESCRIPTION OF THE PREFERRED EMBODIMENTS

Figure 4B:
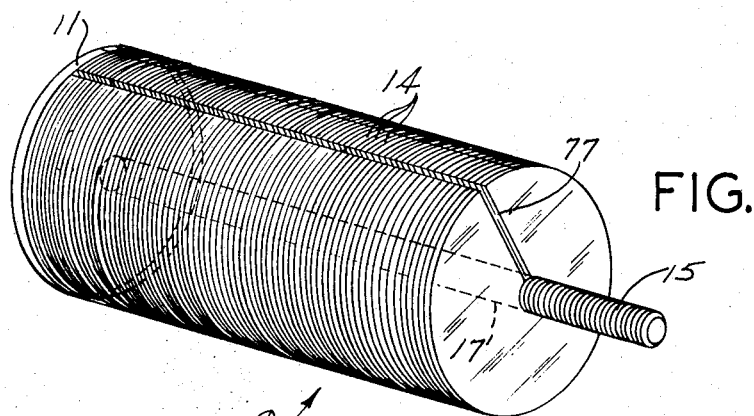
FIG. 4B is a view similar to FIG. 4A showing an alternative pole construction.

Referring now to the drawing, and particularly to FIG. 1, wherein there is shown a linear synchronous motor 1 which comprises an axially split tubular magnetizable shell or housing 3 of generally cylindrical configuration. An axially extending magnetizable pole piece 9 is constituted by a pair of end caps 11 and 13 having a plurality of apertured split disk-shaped washers 14 secured therebetween by a threaded bolt 15 passing through an axial bore 17. The bolt 15 passes through an aperture in an end cover plate 19 and a nut 21 secures the pole piece 9 thereto, the cover plate 19 being secured to an annular retainer ring 23. A magnetizable cylindrical pole sleeve 25 encircling pole 9 is secured at one end to cap 13 by an inwardly directed peripheral lip 27 engaging an interior groove 29, and at the other end to a shoulder 30 on cap 11.

A thin walled stainless steel barrier cylinder 31 is secured at its right end to the outer periphery of end cap 13 and to the inner periphery of retainer ring 23, and at its left end to the inner periphery of a similar retainer ring 33. The cylinder 31 defines the bore of a stator assembly 32 which has an inner dimension somewhat larger than the outer dimension of cylinder 25 thereby defining an annular or tubular gap 34. The stator assembly includes a steady polarizing field source, in this instance, an annularly wound direct current excited field coil 35 carried by a coil bobbin 37, the latter being coaxially mounted about the longitudinal axis of motor 1 on barrier cylinder 31. A permanent magnet may also be utilized in place of the direct current excited field coil 35 to provide the steady polarized field source, though the direct current excited coil is the preferred embodiment. The U- shaped magnetizable keepers 38 secure the housing sections against axial shifting. Stator 32 also includes a pair of coaxial alternating current excited annularly wound stator coils 39 and 41, respectively, received in coil bobbins 43 and 45. Coils 39 and 41 are mounted on barrier cylinder 31 and axially spaced on opposite sides of D.C. field coil 35.

Stator assembly 32 further includes a plurality of radially extending magnetizable laminations arranged in groups designated 47L and 47R. As best illustrated in FIG. 3, each of the stator laminations is of generally inverted U-shaped configuration having a yoke or top crossbar 49 and a pair of depending leg portions 51 and 53. The sides of legs 51 and 53 are notched, as indicated at 55, for receiving the wedge-shaped tips of retainers 23, 33 and bobbin 37. The laminations in group 47L bridge stator coil 39 and the laminations in group 47R bridge stator coil 41. As illustrated in FIG. 2, stator laminations 47 are formed of flat stock and hence diverge throughout their radial extent to form open wedge-shaped passageways 57 between adjacent laminations for the passage of a coolant, such as air. Alternatively, a potting compound or insulating material may be disposed in the spaces 57.

A magnetizable tubular armature, indicated generally at 59, is slidably received within gap 34 between pole sleeve 25 and barrier cylinder 31. The armature has two spaced apart magnetizable portions comprising respectively first and second groups of annular washer-shaped steel laminations 61 and 63 interconnected by a cylindrical sleeve 65, the groups defining a pair of salient poles. As indicated, sleeve 65 is relatively thin, hence light in weight. A similar thin sleeve 67 is secured to the left-hand end of laminations 61 and is provided with a reduced diameter end portion 69, which portion constitutes an output member adapted for connection to a load to be reciprocated. Each of the annular laminations 61 and 63 is split radially, as indicated in FIG. 2 at 71, for reducing eddy-current losses. Thus, armature 59 is of lightweight low-inertia construction and is capable of rapid reciprocatory movement in gap 34 on sleeve 25. It should be noted that sleeve 25 constitutes a strip bearing for movement of armature 59, and is coated with a low friction material such as "Teflon," a fluorocarbon resin sold by E. I. du Pont de Nemours and Company.

Figure 4A:
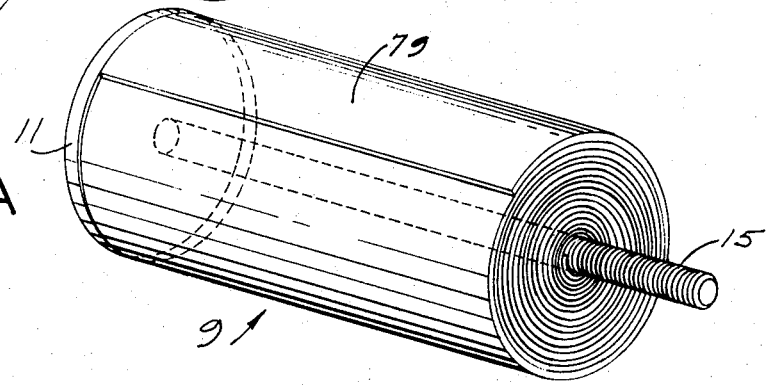
FIG. 4A is a perspective view of a pole piece of the motor of FIG. 1.

Stationary pole 9 as illustrated in FIG. 4A comprises a spiral wound sheet 79 of magnetizable material. The sheet 79 is either wound directly on bolt 15 or on a suitable arbor and then transferred to the bolt. In the latter instance the bent edge of the sheet that is secured to the arbor for winding the pole is preferably removed prior to installation of the pole on the bolt. This may be accomplished by either drilling out the bore of the pole or by a radial saw cut through the pole from one end to the other. End caps 11 and 13 and cylinder 25 complete the pole assembly 9, which is mounted in motor 1 by means of cover plate 19 and nut 21.

An alternative pole construction 9 illustrated in FIG. 4B is constituted by apertured disk-shape magnetizable steel washers 14, each of which is slotted or split radially at 77. Split washers 14 are stacked in face-to-face abutting relationship and are secured together by bolt 15 passing through end caps 11, 13 and axial bore 17. Pole assembly 9 is completed by pole sleeve or cylinder 25, thus forming an efficient flux conducting assembly while minimizing eddy-current losses. This pole assembly 9 is mounted in motor 1 in the same manner as pole 9 of FIG. 4A.

A terminal board cover 81 is mounted on the exterior of cylindrical shell 3 by a pair of band straps 83 and screw clamps 85 (FIGS. 1 and 2). Cover 81 has an aperture for the passage of a power cord 87, the latter being secured to the cover by a cable clamp 89. Mounted within cover 81 is a terminal board 91 having terminals 93 for supplying A.C. power via internal connections (not shown) from the cord 87 to each of the respective coils 39 and 41. A rectifier, such as silicon diode 95 (FIG. 2), is mounted within cover 81 and is interconnected between power cord 87 and D.C. field coil 35 for exciting this coil with direct current. The two A.C. stator coils 39 and 41 are connected to power cord 87 so that they produce oppositely polarized electromagnetic fields. It should be noted that band straps 83 clamp the housing sections 3 to laminations 47 to rigidize the motor.

The operation of linear motor 1 is as follows. Power cord 87 is connected to a suitable A.C. power supply (e.g., 115 v. A.C., 60 c.p.s.) and output member 69 to a suitable load. For example, motor 1 may be utilized to drive devices such as electric carving knives, electric toothbrushes, or compressors for refrigerant gases, etc. In the latter instance, barrier cylinder 31 is extended to the compressor housing to serve as a refrigerant seal or barrier. A suitable on-off switch (not shown) is then thrown to the "on" position to A.C. excite stator coils 39 and 41 and D.C. excite field coil 35. These coils, as will be more fully set forth hereinafter, constitute means for producing a pulsating electromagnetic flux field of varying intensity in the magnetic circuit comprising housing 3, stator laminations 47R, across the right-hand portion of gap 34, armature portion 63, pole 9, armature portion 61, across the left-hand portion of gap 34, and stator laminations 47L where it returns to housing 3. As the applied A.C. input alternates, the magnetic field pulsates, and armature 59 synchronously reciprocates axially to increase the permeance of the instantaneous magnetic flux circuit, thus reciprocating the load connected to output member 69.

Figure 5A:
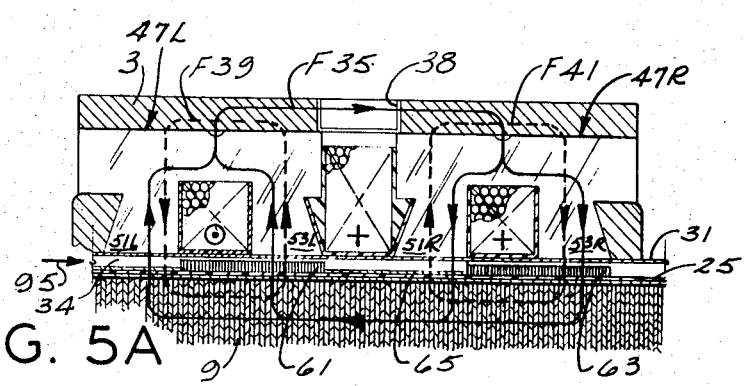
FIGS. 5A and 5B are magnetic circuit diagrams respectively illustrating typical flux paths on successive half-cycles of the alternating power supply.
Figure 5B:
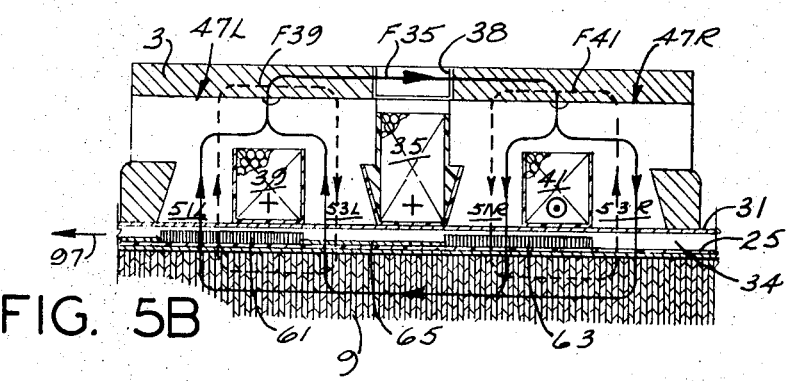

The electromagnetic operation of motor 1 on successive half cycles of the alternating power supply is illustrated in FIGS. 5A and 5B. The leg portions of left and right stator laminations 47L and 47R are respectively designated 51L, 53L and 51R, 53R, and the direction of current flow through coils 35, 39 and 41 is indicated by dots and crosses. Upon energization of the D.C. field coil 35, a steady electromagnetic flux flows through left and right stator laminations 47L and 47R in the direction indicated by solid line $F_{35}$. As illustrated, flux 35 flows in a continuous path through the magnetic circuit constituted by leg portions 51L and 53L, housing sections 3 and keeper 38, leg portions 51R and 53R, across gap 34 and armature portion 63, pole 9 and across gap 34 and armature portion 61 back to leg portions 51L and 53L. On the first half cycle of operation of A.C. stator coil 39 (FIG. 5A), flux, indicated by broken line $F_{39}$, is caused to flow in its corresponding lamination 47L in a downward direction in leg 53L. The complete magnetic circuit about stator coil 39 is through housing 3, down leg 51L, across the working gap 34, through pole 9 and the armature portion 61, and up through leg 53L back to housing sections 3. Similarly, on the first half alternation of A.C. stator coil 41, flux, indicated by broken line $F_{41}$, is caused to flow in its corresponding lamination 47R in an upward direction in leg 51R and in a downward direction in leg 53R. The complete flux path about stator coil 41 is through housing sections 3, down leg 53R and through the armature portion 63, through pole 9 and across the working gap 34, up leg 51R back to the housing 3. Flexes $F_{35}$ and $F_{39}$ in leg 53L, and $F_{35}$ and $F_{41}$ in leg 53R flow in the same direction and reinforce one another to produce a net flux concentrated toward the right-hand portion of laminations 47L and 47R. However, oppositely flowing fluxes $F_{35}$ and $F_{39}$ in leg 51L, and $F_{35}$ and $F_{41}$ in leg 51R cancel, fully or in part, and produce a net flux which is always during the first half cycle of operation of A.C. stator coil 39 less than the net flux in legs 53L and 53R. Hence, armature portions 61 and 63 in response to the change in flux balance is moved to the right, as indicated by arrow 95, to a position wherein they are positioned in part under the respective leg portions 53L and 53R and in part under the respective stator coils 39 and 41 to increase the permeance of the instantaneous magnetic flux circuit.

On the second half cycle of alternation of the A.C. power supply, the flux circuit produced by the coils is as indicated in FIG. 5B. As illustrated, flux $F_{35}$ produced by field coil 35 remains the same as that produced during the first half cycle of operation since coil 35 is D.C. excited, and is directed upwardly through the legs of left-hand lamination 47L and downwardly through the legs of right-hand lamination 47R. The direction of flux flow produced by A.C. stator coils 39 and 41 is reversed since the direction of current flow through these coils is reversed. That is, flux $F_{39}$ flows upwardly through leg 51L, through housing sections 3 and downwardly through leg 53L of left-hand lamination 47L, through armature portion 61 and on through pole 9, across working gap 34 back to leg 51L. Flux $F_{41}$ flows upwardly through leg 53R through housing sections 3 and downwardly through leg 51R of right-hand lamination 47R, through armature portion 63 and on through pole 9, across working gap 34, and back to leg 53R. Thus, on the second half cycle of operation, oppositely fluxes in legs 53L and 53R cancel fully or in part whereas the flux in legs 51L and 51R is reinforced to shift the net flux from the right-hand legs to the left-hand legs of laminations 47L and 47R. Hence, armature portions 61 and 63 in response to the change in the flux balance is moved to the left, as indicated by arrow 97, to a position wherein they are positioned in part under the respective leg portions 51L and 51R and in part under the respective stator coils 39 and 41 to increase the permeance of the instantaneous magnetic flux circuit. On a complete electrical cycle of operation, therefore, the flux and hence armature 59 are caused to reciprocate axially through one complete cycle. As is apparent, the second, third, fourth, etc. alternations of the A.C. power supply cause the flux and armature 59 to reciprocate axially between the positions illustrated in FIGS. 5A and 5B.

The force acting on the armature 59 and causing the same to synchronously reciprocate with alternating and pulsating electromagnetic flux fields may be expressed instantaneously as follows:

$$F = \tfrac{1}{2} I^2 \frac{dL}{dX}$$

where:

F = force
I = current in the exciting coil
L = inductance of magnetic circuit
X = displacement of the armature.

The superior performance of the present motor is derived from separation of the two basic magnetic circuit functions which the armature of an iron core reluctance device must support. These two functions are to complete the magnetic circuit path and to generate a change in permeance of the magnetic circuit. The above equation can be further reduced to disclose the separation of functions since the inductance of a linear magnetic circuit, excluding saturation effects, may be expressed as follows:

$$L = N^2 P$$

where:

N = the number of turns which the flux links
P = the permeance of the magnetic circuit.

Since the number of turns in the coil is constant, the force equation can be rewritten as follows:

$$F = \tfrac{1}{2} (NI)^2 \frac{dP}{dX}$$

where:

(NI) = the ampere turns across the working gap of the armature
$dP/dX$ = the change of permeance with respect to displacement of the armature.

As demonstrated in the last equation, the magnitude of the magnetic circuit's permeance does not directly enter into the force equation. Rather, it is the change of permeance with respect to displacement of a magnetic circuit element which determines the force gradient on that element. Since the armature 59 of the present motor is of relatively lightweight low-inertia construction, it is easily reciprocated under the influence of the pulsating magnetic field. The burden of conducting the flux is minimized in the armature and is concentrated in the relatively massive stationary pole piece 9 unlike prior art devices where the armature is part of the pole piece and both are moving as a unit. Thus, the two basic magnetic functions of the armature discussed above are maintained substantially separate. That is, the burden of conducting flux is minimized in the armature by the stationary pole 9, and the geometry associated with generating the change in permeance is maximized because of the discrete groups of laminations 61 and 63 supported by sleeve 65. Thus, as the electromagnetic field pulsates between the legs of stator laminations 47 and across gap 34, armature portions 61 and 63 are forced to synchronously reciprocate to increase the permeance of the instantaneous magnetic flux circuit by alternately aligning themselves generally with the flux conducting legs of the stator laminations. This confinement of armature function produces a substantial improvement in performance of the present linear motor over previous iron core devices. In addition, the force-to-weight ratio of the present motor is superior to that of induction type motors or motors utilizing a current carrying conductor as an armature. Another important characteristic of the present motor is its self-starting ability. That is, the motor is capable of starting under load from a dead stop and supplying full rated force in either direction at all intermediate stroking positions of the armature.

Although in the exemplary invention embodiments described, the stator 47 and the armature 59 consist of laminations, it is not essential that the motor be constructed in this manner. For example, each of these components may be formed of a solid or composition type ferromagnetic material. However, laminations are preferred since they reduce the eddy-current losses. It should be noted that in either case housing 3, laminations 47, armature 59 and pole piece 9 or 9' must be formed of a magnetizable material, such as iron or steel. It should also be noted that D.C. field coil 35 may be replaced with a permanent magnet for producing the steady state electromagnetic field. In this case, housing 3 and keeper 38 are formed of a suitable non-ferrous metal such as aluminum. The motor may also be utilized as a single stroke solenoid by exciting field coil 35 and one or both of the stator coils 39 or 41 from a D.C. source.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A linear synchronous motor comprising a substantially cylindrical stator having a generally longitudinally extending opening therein, a substantially cylindrical magnetizable housing enclosing said stator, an axially extending magnetizable pole piece generally circular in cross section and coaxial with said stator having an outer lateral dimension somewhat less than the inner lateral dimension of said stator to define a gap therebetween, a substantially cylindrical armature having a generally longitudinally extending opening therein disposed within said gap so as to be generally axially movable therein and slidably mounted relative to the pole piece, said armature having two axially spaced magnetizable portions comprising first and second groups of disk-shaped washers supported by a relatively thin cylindrical sleeve, said groups defining a pair of salient poles, and an output member at one end of said armature, said stator, housing, pole piece and armature comprising a magnetic circuit, a substantially annular polarization field source coaxially mounted between said housing and armature, and a pair of substantially annular alternating current stator coils coaxially mounted on opposite sides of said polarization field source and axially spaced therefrom, said first group of disk-shaped washers being radially aligned with one of said stator coils and said second group of disk-shaped washers being radially aligned with the other of said stator coils, each of said washers being split along a radius all the way from its inner to its outer periphery, so that energization of said polarization field source and stator coils with direct and alternating current, respectively, produces a pulsating electromagnetic field of varying intensity in said magnetic circuit and across said gap thereby causing said armature and output member to reciprocate synchronously in said gap to increase the permeance of the magnetic flux circuit.

2. A motor as set forth in claim 1 wherein said stator comprises first and second groups of radially extending U-shaped laminations respectively bridging said stator coils.

3. A motor as set forth in claim 2 wherein said stator laminations diverge throughout their radial extent to form wedge shaped spaces between adjacent laminations, said spaces being adapted for passage of coolant therethrough.

4. A motor as set forth in claim 2 wherein said stator laminations diverge throughout their radial extent to form wedge shaped spaces between adjacent laminations, said spaces being substantially filled with a potting compound.

5. A motor as set forth in claim 1 wherein said pole piece comprises a strip of magnetizable material spirally wound about the longitudinal axis of said motor.

6. A motor as set forth in claim 1 wherein said pole piece comprises a plurality of disk-shaped laminations extending radially in said housing, each of said laminations being split along a radius.

References Cited

UNITED STATES PATENTS

| 3,070,024 | 12/1962 | Romberg | 310—18 XR |
| 2,245,577 | 6/1941 | Dieckman | 310—268 XR |
| 3,013,189 | 12/1961 | Bernier | 335—261 XR |
| 3,312,842 | 4/1967 | Heuchling et al. | 310—18 XR |
| 3,238,397 | 3/1966 | Maness | 310—27 |
| 3,018,467 | 1/1962 | Harris | 310—27 XR |
| 2,469,137 | 5/1949 | Strong | 336—30 |
| 469,441 | 2/1892 | Wightman | 318—119 XR |
| 3,058,649 | 10/1962 | Plègat | 230—55 |
| 796,259 | 8/1905 | Sherman | 310—20 XR |
| 2,897,384 | 7/1959 | Mullen | 310—163 |

FOREIGN PATENTS

| 1,523,129 | 3/1968 | France. |
| 1,450,818 | 7/1966 | France. |
| 90,618 | 12/1967 | France. |

WARREN E. RAY, Primary Examiner

B. A. REYNOLDS, Assistant Examiner

U.S. Cl. X.R.

310—16, 30